United States Patent
Arnold

(12) 
(10) Patent No.: US 6,625,462 B1
(45) Date of Patent: Sep. 23, 2003

(54) METHOD FOR ESTABLISHING A RADIO COMMUNICATION AND TELECOMMUNICATION NETWORK

(75) Inventor: Jörg Arnold, Heidelberg (DE)

(73) Assignee: IP2H AG, Bern (CH)

( * ) Notice: Subject to any disclaimer, the term of this patent is extended or adjusted under 35 U.S.C. 154(b) by 0 days.

(21) Appl. No.: 09/601,483

(22) PCT Filed: Feb. 5, 1998

(86) PCT No.: PCT/DE98/00314

§ 371 (c)(1),
(2), (4) Date: Aug. 2, 2000

(87) PCT Pub. No.: WO99/40694

PCT Pub. Date: Aug. 12, 1999

(51) Int. Cl.$^7$ .............................. H04Q 7/15; H04Q 7/20; H04Q 7/00; H04B 7/00
(52) U.S. Cl. ...................... 455/500; 455/11.1; 455/456; 455/461
(58) Field of Search ................................ 455/455, 458, 455/403, 435, 437, 436, 461, 500, 502, 519, 524, 525, 91, 11.1, 422, 432, 456, 9.95, 7, 526; 370/254, 238, 351

(56) References Cited

U.S. PATENT DOCUMENTS

| | | | |
|---|---|---|---|
| 5,412,654 A | * 5/1995 | Perkins | 370/312 |
| 5,535,195 A | * 7/1996 | Lee | 370/256 |
| 5,652,751 A | 7/1997 | Sharony | |
| 5,850,593 A | * 12/1998 | Uratani | 455/11.1 |
| 6,128,287 A | * 10/2000 | Freeburg et al. | 370/331 |
| 6,275,707 B1 | * 8/2001 | Reed et al. | 455/456 |
| 6,304,556 B1 | * 10/2001 | Haas | 370/254 |
| 6,338,087 B1 | * 1/2002 | Okanoue | 709/222 |
| 6,442,147 B1 | * 8/2002 | Mauger et al. | 370/321 |
| 2003/0054828 A1 | * 3/2003 | Dent | 455/450 |

FOREIGN PATENT DOCUMENTS

| | | |
|---|---|---|
| DE | 33 37 648 A1 | 2/1987 |
| DE | 195 35 021 A1 | 7/1997 |
| DE | 197 26 956 A1 | 1/1998 |

OTHER PUBLICATIONS

*A Self–Organisation Plane for Distributed Mobile Wireless Networks*, A. O. Mahajan et al., Bringing Telecommunication Services to the People—ISS & N 1995, Third International Conference on Intelligence in Broadband Service and Networks, Heraklion, Crete, Oct. 1995.

\* cited by examiner

Primary Examiner—Nay Maung
Assistant Examiner—Edan Orgad
(74) Attorney, Agent, or Firm—Alston & Bird LLP

(57) ABSTRACT

A method of establishing a radio link between subscribers of a telecommunications network, in particular in a decentralized mobile radio network with mobile radio sets serving both as terminals and as transmitters, wherein at least one virtual transmitter for switching the radio signals can be defined for each subscriber, and wherein one or more subscribers can assume the work of the virtual transmitter or transmitters, and a telecommunications network, in particular a decentralized mobile radio network with mobile radio sets serving both as terminals and as transmitters, and in particular for carrying out the method, wherein at least one virtual transmitter for switching the radio signals can be defined for each subscriber, and wherein the work of the virtual transmitter or transmitters can be assumed by one or more subscribers.

10 Claims, 1 Drawing Sheet

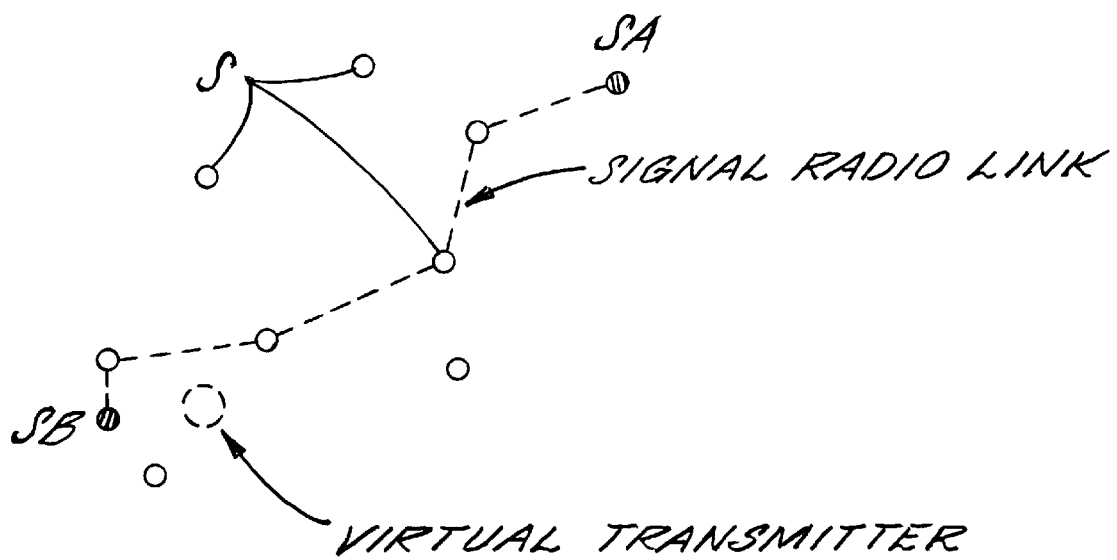

METHOD FOR ESTABLISHING A RADIO COMMUNICATION AND TELECOMMUNICATION NETWORK

BACKGROUND OF THE INVENTION

The invention relates to a method of establishing a radio link between subscribers of a telecommunications network, in particular in a decentralized mobile radio network with mobile radio sets serving both as terminals and as transmitters.

Furthermore, the invention relates to a telecommunications network, in particular a decentralized mobile radio network with mobile radio sets serving both as terminals and as transmitters.

Methods of the kind under discussion are known in connection with radio networks, such as, for example, the mobile radio networks known as C-, D1-, D2, and E-plus networks. Furthermore, telecommunications networks of the kind under discussion are known from practice. For establishing a radio link, the known telecommunications networks comprise stationary radio equipment in the form of stationary transmitters. The establishment of a radio link occurs by means of external switching methods within the scope of an external radio network management. The localization of the network subscribers and the establishment of a link between the network subscribers occurs in these mobile radio networks by means of the central switching equipment.

In the establishment of a radio link, the central transmitters play the fundamental part, since they are in a constant, reciprocal contact with the network subscribers via a division of the radio network into individual network cells. Thus, the respective transmitter always knows the location of the network subscriber by its response to the transmitter and furthermore to the network control center.

When a radio link is established between two network subscribers, the network subscribers are first localized by means of the central switching method. Subsequently, the radio link between the network subscribers is computed or determined, and then offered. In this connection, the preliminary computation or determination of the communication path via possible relay links is named "routing."

The known methods operate between the mobile radio sets and the stationary transmitters of the respective network cells of the known radio networks. In the case of the known radio networks of this kind, it is thus essential that external and centrally controlled methods be applied, which are operated mainly from an external operator station—for example, a central operating computer—outside of the individual mobile radio sets or radio terminals.

Besides these known methods and telecommunications networks with stationary transmitters, it is also known to use methods and telecommunications networks, which are totally decentralized, and which use mobile radio sets both as terminals and as transmitters. In this instance, stationary transmitters, which are centrally controlled, are omitted. Note, in particular Applicant's Application No. 195 35 021.9 filed in Germany, which describes a radio network that employs mobile radio sets both as terminals and as transmitters. The described radio network is designed as a neural network, which is totally selfmanaging and selfcontrolling.

Without limitation to this type of network, the present invention is described by way of the aforesaid neural network, wherein the mobile radio sets serve both as terminals and as transmitters. In this system, stationary network cells are no longer formed. While it is thus no cellular system, it comprises identical, dynamic neighborhood areas of each subscriber. The size of such a substantially circular neighborhood area around an observed subscriber is dimensioned by that distance from the observed subscriber, in which the radio communication of the observed subscriber can still be monitored by another, neighboring subscriber. In the case of an unimpeded radio wave propagation, this distance is the radius of the neighborhood area. In the case of radio interferences or radio obstructions, the neighborhood area may also assume a shape that deviates from a circle.

The size of a neighborhood area continues to be dependent on the radio coverage. During a movement of the observed subscriber, the neighborhood area moves along with the subscriber. Therefore, the telecommunications network under discussion, is a real, totally mobile network. Mobile networks can otherwise be realized only by investment-cost-intensive mobile satellite network systems. This radio network is a distribution network without a centralized switching service. Switching is automatically and collectively performed by one or more subscribers after calling a destination subscriber.

An active subscriber—the source subscriber—forms a network relay link with one of its next neighbors, with which it establishes a direct radio contact. Unless they are the called destination subscribers, these neighbors serve as transmitters. Between the source subscriber and the destination subscriber, the radio link may occur via a plurality of transmitters. In this instance, the network link will consist of a plurality of network relay links between the individual transmitters.

To localize and address the subscribers, the subscribers receive a position identification, which can be actualized after certain time intervals. The position identification is known to each subscriber via an address directory, or it is stored in the mobile radio set. This position identification is useful in a destination-directed establishment of a radio link, since it makes it possible to prevent a radio call from propagating like an avalanche for purposes of establishing a radio link. Instead, it can be approximately predetermined in the direction toward the destination receiver. Such a method of establishing a radio link has already been disclosed in Applicant's German Application 197 26 956.7.

In the stage of development of the above described neural telecommunications network until now in part quasi stationary transmitters are provided, which are formed by a functional part of a mobile radio set. Each user has a mobile radio set, which consists of a terminal element and a spatially separable transmitter element. This transmitter element is stationarily installed at the user as a quasi stationary base transmitter with a fixed position identification. With that, not only all radio links of the user, but also any radio links of other subscribers can occur via the user-associated transmitter element or via transmitter elements of other subscribers.

Besides the position identification, a subscriber also disposes of a subscriber-specific identification. This could be, for example, the name of the user.

In the case of constantly stationary subscribers, it possible to establish a radio link exclusively by way of the position identification. As soon as the subscriber moves with its terminal element, this will no longer be possible at first sight, since the subscriber has left the position known to the other subscribers, and since the other subscribers then do not yet know the new position of the destination subscriber.

However, a movement of the destination subscriber within the neighborhood area of the transmitter nearest to it in the radio chain is noncritical, since the destination subscriber can hear the radio call of this nearest transmitter, and identify itself as destination subscriber via the subscriber-specific identification. With that, it is possible to establish the radio link in full.

In such a telecommunications network, an establishment of a radio link or an offered radio link remains likewise unaffected by a movement of the subscriber, as long as the neighborhood areas of the subscribers of a radio link chain or the transmitters overlap in part. In other words, a radio link or an establishment of a radio link remains possible as long as the destination subscriber is located with its terminal element within the neighborhood area of any transmitter of the radio link chain. This can be explained by the fact that during its transmission work, each transmitter also transmits the complete address of the destination subscriber—position identification and subscriber-specific identification—and the destination subscriber monitors the transmission operations of the transmitters and, if need be, is then able to identify itself as destination subscriber. This spatial region of the composite neighborhood areas of all transmitters, which is noncritical with respect to the establishment of the radio link and the radio link during the movement of a destination subscriber, is named radio hose. In other words, the radio hose is that regional surface, which is covered by the neighborhood area surfaces of the chain subscribers of a radio link.

However, if a destination subscriber moves out of the foregoing neighborhood areas of the intended transmitters, a different localization mechanism with respect to the observed subscriber will be operative, in which it is necessary to newly identify the subscriber in its new position. This new position identification is transmitted, for example, to its stationary base transmitter, which is then in a position to retransmit radio calls made via same to the observed subscriber.

In conclusion, it remains to be stated that the respective base transmitter of a destination subscriber is in essence permanently stationary, and that its position identification is recorded in the subscriber directory or address directory of the telecommunications network. Moving network subscribers can then be addressed via their associated base transmitter. Same retransmits as a transmitter the radio link to the moving terminal of the network subscriber.

However, in the known telecommunications network it is problematic that a quasi stationary structure exists in the form of the base transmitters. Such a structure is normally named "backbone." Such a stationary structure restricts the flexibility of the telecommunications network and subscribers considerably, since it is always necessary to position a base transmitter and to permanently handle two components of the equipment, namely the terminal element and the transmitter element.

It is therefore the object of the present invention to describe a method of establishing a radio link as well as a telecommunications network of the kind under discussion, which allows to attain a greater flexibility and convenience when in use.

SUMMARY OF THE INVENTION

In accordance with the invention, the foregoing object is accomplished by defining for each subscriber at least one virtual transmitter for switching the radio signals, and that one or more subscribers are able to assume the work of each virtual transmitter. Also, for establishing a radio link between a signal transmitter and a signal receiver, a virtual transmitter is assigned to the signal receiver, and the assigned virtual transmitter is allocated the position identification of a previous location of the signal receiver or a position identification that is freely selectable and not taken by another subscriber.

To begin with, it has been recognized according to the invention that it is basically possible to realize a telecommunications network and a method of establishing a radio link within the telecommunications network, wherein solid structures in the meaning of a "backbone" are omitted. To this end, the invention further provides that for each subscriber, at least one virtual transmitter is defined for switching the radio signals. The definition of such a virtual transmitter makes it possible to do without the known, stationary and real base transmitters. Since such a virtual transmitter does not physically exist, the invention further provides that one or more subscribers assume the work of the virtual transmitter or transmitters. The subscribers, which assume the work of the virtual transmitter or transmitters, are preferably stationary at times. A number of stationary subscribers, which is adequate for the operation of the network, always exists in the telecommunications network under discussion from a statistic viewpoint, since it is unlikely that all subscribers of the telecommunications network are constantly in motion.

Consequently, the method of establishing a radio link according to the present invention realizes a method, which allows to attain a greater flexibility and ease when in use, and thus enables a greater portion of movement of the network subscribers.

In a particularly advantageous manner, it would be possible that the subscriber or subscribers, which assume the work of the virtual transmitter or transmitters, realize individually or collectively the virtual transmitter or transmitters by assuming the work. This would make it possible to attain a particularly simple realization of virtual transmitters.

Furthermore, it would be possible to associate to the signal receiver the virtual transmitter for establishing a radio link between a signal transmitter and a signal receiver. This would make it possible to realize quasi a virtual base transmitter for the signal receiver through the virtual transmitter.

To this end, it would be possible to allocate to the virtual transmitter in a particularly direct manner, the position identification of a previous location of the signal receiver. As a result of allocating such a position identification, a definition of the virtual transmitter would then involve that a radio call to the signal receiver is transmitted to its known, previous location. There, it would basically not be possible to reach it, since it has already moved away from this location. When the virtual transmitter is defined, which occurs by a radio call to the desired position of the virtual transmitter being defined, the transmitters in the neighborhood area of the desired position of the virtual transmitter are however informed via a special coding of the radio call that it is only a virtual transmitter at the particular location. Consequently, the neighboring transmitters are able to retransmit the radio call, if need be, by dividing their work, to the destination subscriber, whose new position has been reported during the definition of the virtual transmitter to the transmitters of the neighborhood area of the desired position of the virtual transmitter. As a result, it would be possible to retransmit the radio signals, via the virtual transmitter, to the signal receiver or destination subscriber.

As an alternative to such a retransmission, it would be possible that the virtual transmitter transmits to a previous transmitter and/or to the signal transmitter the new, changed position identification of the signal receiver or destination subscriber. With that, there exist two possibilities of switching the radio signals via the virtual transmitters.

The determination of the position identification may occur in a fast and automatic way in that the moving signal receiver computes in its actual neighborhood area, its new position identification from the monitored position identifications of its neighboring subscribers. More specifically, the observed signal receiver localizes itself in its "new" neighborhood area with the aid of at least temporarily stationary transmitters. This occurs in that as a potential transmitter of other radio links, the observed subscriber monitors the radio communication of its neighborhood area, and receives and stores the position identifications of the neighboring subscribers in its neighborhood area. It may use these data to compute its own actual position. To this end, the usual interpolation methods are available. In the case that the position identification is computed from, for example, absolute, satellite-assisted data, it will be possible to generate even exact, own position identifications.

Besides allocating the position identification of a previous location of the signal receiver to the virtual transmitter, it would also be possible, for purposes of increasing flexibility, to allocate to the virtual transmitter a freely selectable position identification and/or a position identification not taken by another subscriber. With that, a virtual base transmitter would be defined in locations, in which the signal receiver has never been.

In a flexible manner, it would be possible to define the virtual transmitter, through the signal receiver, actively with respect to its user action, or automatically as a function of fulfilling a predeterminable condition. In this connection, the user could make the frequency of the definition of a virtual transmitter dependent on how reliably it wants to be reachable within the telecommunications network. The more often it defines virtual transmitters through a radio call, or the more often it notifies possibly already existing virtual transmitters of its possibly changed position identification, the better and more reliably it can be reached. The definition of a virtual transmitter as a function of fulfilling a predeterminable condition could be a temporal condition, i.e., the definition of a virtual transmitter automatically occurs at predeterminable time intervals.

In a particularly comfortable manner, the automatic definition could occur, after the signal receiver has left its original neighborhood area, or after one or more predeterminable subscribers in the original neighborhood area have left same or their original neighborhood area, or after the signal receiver has left the neighborhood area of one or more predeterminable subscribers. The first alternative describes the instance, wherein the signal receiver has clearly reduced the probability that it can be reliably reached because of leaving its original neighborhood area. The second alternative considers the instance, wherein defined transmitters are no longer available, and that thus the transmitter density is possibly reduced such that a reliable availability of the signal receiver is no longer guaranteed. The third alternative considers the instance similar to the second alternative, wherein defined transmitters, even including transmitters having originally been outside of the original neighborhood area of the signal receiver, are no longer available. However, these transmitters are no longer available, because this time the signal receiver has moved and not the transmitters. An automatic definition of one or more virtual transmitters could however occur, even when one or more predeterminable subscribers have removed themselves from their neighborhood area. In this instance, the observed subscribers need not have originally been in the neighborhood area of the signal receiver.

Depending on the addressing or position identification system, it would be possible to allocate to the subscribers a location-related and/or a subscriber-related identification. The definition of virtual transmitters occurs in accordance with the selected identification system.

For a better understanding of the foregoing method of establishing a radio link, same is summarized one more time as follows:

In the case that the observed destination subscriber removes itself from its original location, it will report at certain time intervals to the subscribers of its original neighborhood area for purposes of transmitting its new position identification. In this instance, it addresses its future, virtual base transmitter, which is allocated the position identification of its original location. This radio call serving to define the virtual base transmitter is retransmitted to the original location, where it is monitored and stored by potential transmitters and neighbors of this location, which have a similar position identification. In the case of this radio call, a corresponding radio code sequence parameter is put on the mode "base transmitter response" and transmitted. This effects that the potential transmitters in the original neighborhood area are informed about the definition procedure, and discontinue to be active after a preferably discontinued search for the virtual base transmitter. Thus, the establishment of the radio link is discontinued at these transmitters, since the destination subscriber or the virtual base transmitter is not found. However, all nearest neighbors of this location will then know the new address of the observed destination subscriber.

That transmitter, which is within a deliberate attempt of establishing a radio link with the observed subscriber, the last member in the radio link chain, and which receives no further positive signal for taking over or no signal of the destination subscriber, will then search its memory for the specified destination address of the network subscriber being searched. When it becomes successful, i.e., when radio call code sequences with the destination address of the searched subscriber and parameters put on "base transmitter response" exist, this transmitter will assume the part of the searched virtual base transmitter. It will identify itself as such and then transmit the new position identification of the searched destination subscriber in accordance with the base transmitter function, or it connects directly to same.

In the described method, it is essential that in a certain local area, network subscribers be available, which do not all move out of this area at the same time, or which do not all move within this area at the same time. However, this condition is nearly always met for statistical reasons.

The introduction of virtual transmitters makes it possible to realize a radio relay network without hardware, i.e., without a "backbone." Instead of using a "backbone" to assist the telecommunications network, an information pattern, for example, a routing information pattern is put in the network. By addressing virtual storage locations, which represent the virtual transmitters or the neighborhood areas, routing information can be stored decentralized and used everywhere in the network.

The definition of a plurality of virtual transmitters makes it possible to generate in many ways radio link structures that are realized as tree structures, star structures, ring structures, or mixed topological structures. If need be, this would permit predetermining in a purposeful manner even complicated information transmission links with nodal and switching points, to circulate, for example, media information, which is intended for an entire group of receivers.

It would also be possible to include useful-content-dependent, thematic priority parameters in the radio call code sequence, which is essential for establishing a radio link, and contains, for example, the destination subscriber identification, the transmitter identification of the previously transmitting subscriber, the time of the transmission by the signal transmitter, the position identification of the signal transmitter, a parameter of identifying a base transmitter response, and parameters with respect to the transmitting power priority. This means, depending on the identification of useful contents, the transmission occurs with a greater or lesser priority. Besides determining the priority of such transmissions, such an identification also provides a distinction between different thematic transmissions. Thematic transmissions of information may be media applications that are to be unidirectionally transmitted, with one source and different destination subscribers. These may be data transmissions between a plurality of sources and a plurality of destination subscribers, conference or broker circuits.

The transmission of such information flows may be determined in the radio link takeup procedure, preferably via transmitters, which have previously transmitted this subject matter during a certain elapsed period of time. The destination transmitter with a thematic priority automatically retransmits thematic radio calls, which are intended for any defined destination subscriber, to all other destination subscribers known to it with identical signal transmitter identification and identical, thematic priority number. As a result, identical information flows, which proceed from the same source subscriber to a plurality of destination subscribers, reach the destination subscribers no longer via many different radio paths that are to be individually offered and maintained, but via common relay radio paths or chains of relay radio links with the same transmitters, which simultaneously operate as distributors at the nodes.

A thematic transmitter selection allows thematically selected transmitter radio paths to build up among one another. In this instance, thematically defined radio paths or thematic subnetworks are realized besides the address-defined radio paths. By reducing a thematic transmission to thematically selected transmitters, a thematic subnetwork automatically results after the procedure with a minimum number of transmitters in the radio paths, or relay radio paths, or chains of relay radio paths, which superpose preferably congruently, or form star-shaped, ring-shaped, or branched tree structures of the transmission paths.

These thematic radio paths correspond up to the nodes to the different receivers. At the nodes, the respective transmitter directly addresses, if need, a plurality of additional destination transmitters. As a result of the thematic selection, distributors or distributor nodes automatically form from previous, simple transmitters.

Thematic radio transmissions automatically minimize the radio activity of the radio network. On the one hand, it is possible to transmit data from the source of information, via common relay radio paths with a minimal number of common transmitters to different end subscribers. On the other hand, individual end subscribers, which request thematic radio transmissions from a source, possibly need no longer establish a radio contact up to the source subscriber. Instead, they need to find only any transmitter already included in the thematic transmission for purposes of engaging in the thematic radio network.

In the ideal case only a single end subscriber needs to establish a radio contact to the terminal source subscriber. Yet, the end subscribers will not lose the possibility of transmitting, if need be, interactive data to the terminal source. In the case that the thematic data transmissions are time information programs, the source subscriber needs to transmit each time only one information packet for all thematic end subscribers.

At this point, it should be noted that because of realizing virtual transmitters, the greater mobility of the subscribers makes it possible to reach and link moving transmitters for connecting different networks of this kind via traffic routes of the transmitters, for example, interstate highways, waterways, and railroads.

BRIEF DESCRIPTION OF THE DRAWING

The attached drawing schematically illustrates a telecommunication network wherein a signal radio link is established between a signal transmitter and a signal receiver utilizing a virtual transmitter in accordance with the present invention.

DETAILED DESCRIPTION OF A PREFERRED EMBODIMENT

Referring more particularly to the drawing, a telecommunication network, in particular a decentralized mobile radio network, is illustrated which is composed of a plurality of subscribers S which comprise mobile radio sets and which serve both as terminals (i.e. receivers) and as transmitters. The network is designed such that it is possible to define for each subscriber at least one virtual transmitter for switching the radio signals, and the work of the virtual transmitter or transmitters is assumable by one or more subscribers. Thus as schematically illustrated in the drawing, a signal radio link may be established between the subscriber $S_A$ which comprises a signal transmitter and a subscriber $S_B$ which comprises the signal receiver, utilizing the virtual transmitter.

As regards a possibility of designing and constructing the telecommunications network, the foregoing description is herewith incorporated by reference for purposes of avoiding repetitions. In particular, reference is expressly made to the constructional features of a telecommunications network as described in the explanation of the method claims. The invention encompasses such a preferred embodiment of the telecommunications network.

What is claimed is:

1. Method of establishing a radio link between subscribers in a decentralized mobile radio network with each subscriber comprising a mobile radio set which serves as both a receiver and a transmitter, wherein for each subscriber at least one virtual transmitter substantially identified by a position identification can be defined for switching radio signals, and that one or more subscribers can assume the work of each virtual transmitter, wherein for establishing a radio link between a signal transmitter and a signal receiver, a virtual transmitter is assigned to the signal receiver, and wherein the assigned virtual transmitter is allocated the position identification of a previous location of the signal receiver or a position identification that is freely selectable and not taken by another subscriber.

2. Method of claim 1, wherein the one or more subscribers, which assume the work of each virtual transmitter, individually or collectively realize the virtual transmitter by assuming the work.

3. Method of claim 1, wherein the radio signals are retransmitted to the signal receiver via the virtual transmitter.

4. Method of claim 1, wherein the virtual transmitter transmits to a previous transmitter and/or the signal transmitter the new, changed position identification of the signal receiver.

5. Method of claim 1, wherein the signal receiver computes its new position identification in its actual neighborhood area from the monitored position identifications of its neighboring subscribers.

6. Method of claim 1, wherein the virtual transmitter is defined by the signal receiver, actively with respect to a user action, or automatically as function of meeting with a predeterminable condition.

7. Method of claim 1, wherein an automatic defining of the virtual transmitter occurs, after the signal receiver has left its original neighborhood area, or after one or more predeterminable subscribers in the original neighborhood areas have left same or their original neighborhood area, or after the signal receiver has left the neighborhood area of one or more predeterminable subscribers.

8. Method of claim 1, wherein the subscribers are allocated a location-related and/or a subscriber-related identification.

9. Method of claim 1, wherein a plurality of virtual transmitters are defined which permit generating radio link structures that are realized as tree structures, star structures, ring structures, or mixed topological structures.

10. A decentralized telecommunication network comprising a plurality of subscribers, with each subscriber comprising a mobile radio set which serves both as a receiver and a transmitter, and comprising means for defining for each subscriber at least one virtual transmitter substantially identified by a position identification for switching radio signals, wherein the work of the at least one virtual transmitter is assumable by one or more subscribers, wherein the at least one virtual transmitter is assigned to a signal receiver for establishing a radio link between a signal transmitter and the signal receiver, and wherein the virtual transmitter is allocated the position identification of a previous location of the signal receiver or a position identification that is freely selectable and not taken by another subscriber.

* * * * *